US008689555B2

(12) United States Patent
Wong

(10) Patent No.: US 8,689,555 B2
(45) Date of Patent: Apr. 8, 2014

(54) SYSTEM AND METHOD FOR COOLING A TURBOCHARGER

(75) Inventor: Kevin C. Wong, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 524 days.

(21) Appl. No.: 13/086,536

(22) Filed: Apr. 14, 2011

(65) Prior Publication Data

US 2012/0260649 A1    Oct. 18, 2012

(51) Int. Cl.
*F02B 33/44* (2006.01)
*F02B 29/04* (2006.01)
*F01P 1/06* (2006.01)

(52) U.S. Cl.
USPC .......................... 60/605.3; 60/599; 123/41.31

(58) Field of Classification Search
USPC ........................................................ 60/605.3
See application file for complete search history.

(56) References Cited

U.S. PATENT DOCUMENTS

| | | | | |
|---|---|---|---|---|
| 3,827,236 A | * | 8/1974 | Rust | 60/605.1 |
| 4,422,295 A | * | 12/1983 | Minami et al. | 60/605.3 |
| 4,561,387 A | * | 12/1985 | Korkemeier et al. | 123/41.31 |
| 4,829,939 A | * | 5/1989 | Veenemans et al. | 123/41.29 |
| 4,928,637 A | * | 5/1990 | Naitoh et al. | 123/41.31 |
| 4,977,743 A | * | 12/1990 | Aihara et al. | 60/605.3 |
| 5,201,285 A | * | 4/1993 | McTaggart | 123/41.31 |
| 5,275,133 A | * | 1/1994 | Sasaki et al. | 123/41.31 |
| 5,392,604 A | * | 2/1995 | Nikula et al. | 60/605.3 |
| 5,415,147 A | * | 5/1995 | Nagle et al. | 123/563 |
| 6,098,576 A | * | 8/2000 | Nowak et al. | 123/41.33 |
| 6,196,167 B1 | * | 3/2001 | Marsh et al. | 123/41.09 |
| 6,647,934 B2 | * | 11/2003 | Marsh et al. | 123/41.33 |
| 6,668,553 B1 | * | 12/2003 | Ghizawi | 60/605.3 |
| 7,469,689 B1 | * | 12/2008 | Jones et al. | 123/559.1 |
| 7,669,416 B2 | * | 3/2010 | Pantow et al. | 60/599 |
| 7,836,694 B2 | * | 11/2010 | Arnold | 60/605.3 |
| 8,544,453 B2 | * | 10/2013 | Bell et al. | 123/559.1 |
| 2009/0130928 A1 | * | 5/2009 | Taylor et al. | 440/88 M |
| 2011/0180026 A1 | * | 7/2011 | Heusler | 123/41.44 |
| 2011/0296834 A1 | * | 12/2011 | Kuhlbach et al. | 60/605.3 |

FOREIGN PATENT DOCUMENTS

| | | | | |
|---|---|---|---|---|
| CN | 201133280 Y | * | 10/2008 | |
| EP | 1923548 A2 | * | 5/2008 | |
| GB | 2486419 A | * | 6/2012 | F01P 3/12 |
| JP | 60228729 A | * | 11/1985 | F02B 39/00 |
| JP | 60261931 A | * | 12/1985 | F02B 39/00 |
| JP | 60261932 A | * | 12/1985 | F02B 39/00 |
| JP | 61055318 A | * | 3/1986 | F02B 39/00 |
| JP | 63235623 A | * | 9/1988 | F02B 39/00 |
| JP | 02091423 A | * | 3/1990 | F02B 39/00 |
| JP | 03249331 A | * | 11/1991 | F02B 39/00 |

* cited by examiner

*Primary Examiner* — Thomas Denion
*Assistant Examiner* — Jessica Kebea
(74) *Attorney, Agent, or Firm* — Quinn Law Group, PLLC

(57) ABSTRACT

A vehicle includes an intercooler cooling fluid circuit coupled to and in fluid communication with a turbocharger of an internal combustion engine for circulating a flow of cooling fluid to the turbocharger to cool the turbocharger. A turbocharger cooling control valve controls fluid flow between the turbocharger and an intercooler. The turbocharger cooling control valve directs the flow of the cooling fluid to the intercooler when the engine is running, directs the flow of cooling fluid to the turbocharger when the engine is not running. The vehicle uses an intercooler pump for circulating the cooling fluid to both the intercooler when the vehicle is running and the turbocharger when the vehicle is not running.

19 Claims, 4 Drawing Sheets

SYSTEM AND METHOD FOR COOLING A TURBOCHARGER

TECHNICAL FIELD

The invention generally relates to a system and method for cooling a turbocharger of an internal combustion engine, and more specifically for cooling the turbocharger after the internal combustion engine has stopped running.

BACKGROUND

Internal combustion engines may use a turbocharger to compress a flow of combustion air. The turbocharger absorbs heat during operation, which may lead to oil coking within bearings of the turbocharger. As defined herein, oil coking includes the breakdown of lubricating grease and/or oil, and the formation of carbon residue on the components of the turbocharger. Where packaging of the turbocharger on the engine and within an engine compartment of the vehicle permits, the turbocharger may be passively cooled by a convective thermal siphon. However, when the turbocharger is mounted high on the engine due to design and/or packaging constraints, there may be insufficient coolant levels to create a convective cooling loop. In such circumstances, an independent electric pump dedicated to circulating the coolant through the turbocharger may be utilized to cool the turbocharger.

SUMMARY

A vehicle is provided. The vehicle includes a turbocharger for compressing a flow of combustion air, and an intercooler cooling fluid circuit circulating a flow of cooling fluid therethrough. The intercooler cooling fluid circuit includes a low temperature heat exchanger configured for transferring heat from the flow of cooling fluid to a flow of ambient air. An intercooler pump is configured for circulating the flow of cooling fluid through the intercooler cooling fluid circuit. An intercooler is configured for transferring heat from the flow of compressed combustion air to the flow of cooling fluid. The vehicle further includes a first fluid passage in fluid communication with the intercooler cooling fluid circuit and the turbocharger, and a turbocharger cooling control valve interconnecting the first fluid passage and the intercooler cooling fluid circuit. The turbocharger cooling control valve is disposed downstream of the low temperature heat exchanger and upstream of the intercooler. The turbocharger cooling control valve is moveable between a first position and a second position. When in the first position, the turbocharger cooling control valve directs the flow of cooling fluid to the intercooler to absorb heat from the flow of combustion air. When in the second position, the turbocharger cooling control valve directs the flow of cooling fluid to the turbocharger to cool the turbocharger.

A method of cooling a turbocharger for an internal combustion engine is also provided. The method includes sensing an operating status of the internal combustion engine to determine when the internal combustion engine switches from an engine on status to an engine off status. A flow of cooling fluid circulating through an intercooler cooling fluid circuit is re-directed to direct the flow of cooling fluid to the turbocharger to cool the turbocharger when the operating status of the internal combustion engine is switched from the engine on status to the engine off status.

Accordingly, the intercooler cooling fluid circuit is utilized to provide cooling fluid to the turbocharger when the engine switches from the engine on status, i.e., the engine is running, to the engine off status, i.e., the engine is not running. The intercooler pump is used to circulate the cooling fluid to the intercooler when the engine is running, and is also used to circulate the cooling fluid to the turbocharger when the engine is not running, thereby eliminating the need for an independent pump dedicated to circulating cooling fluid to the turbocharger.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
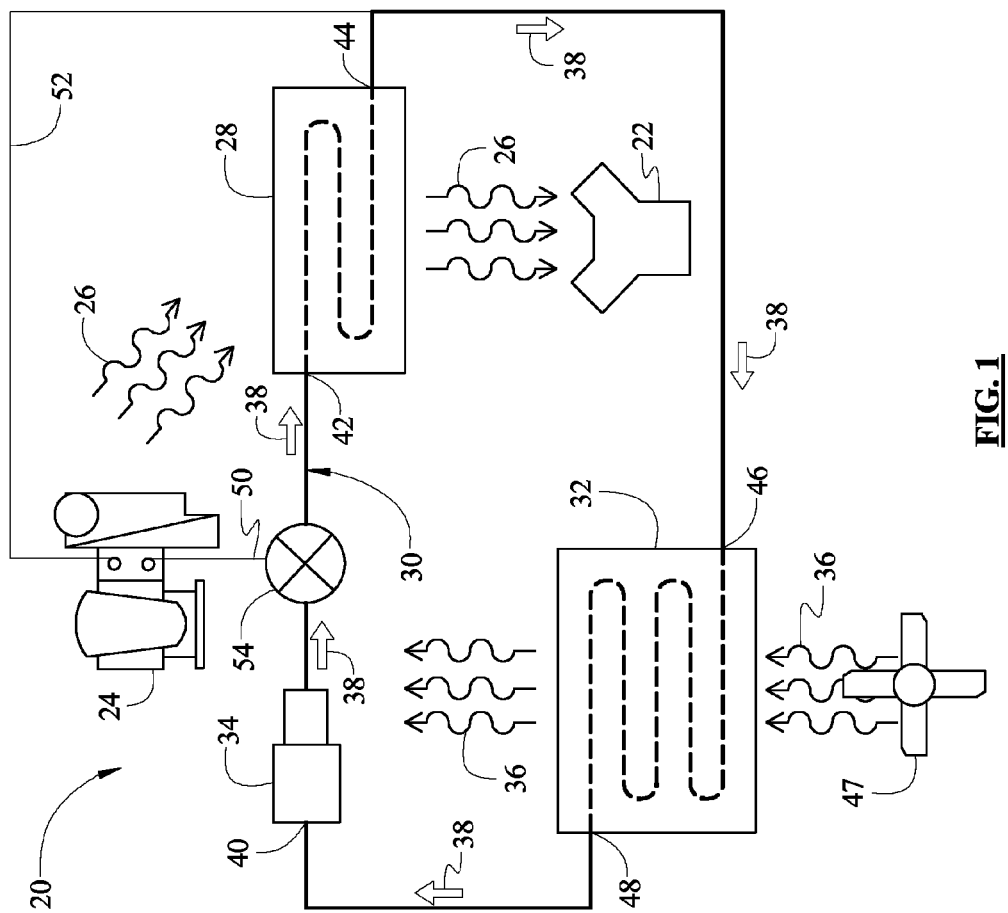
FIG. 1 is a schematic diagram of a vehicle showing an intercooler cooling fluid circuit circulating a cooling fluid through an intercooler to cool a flow of combustion air from a turbocharger.
Figure 2:
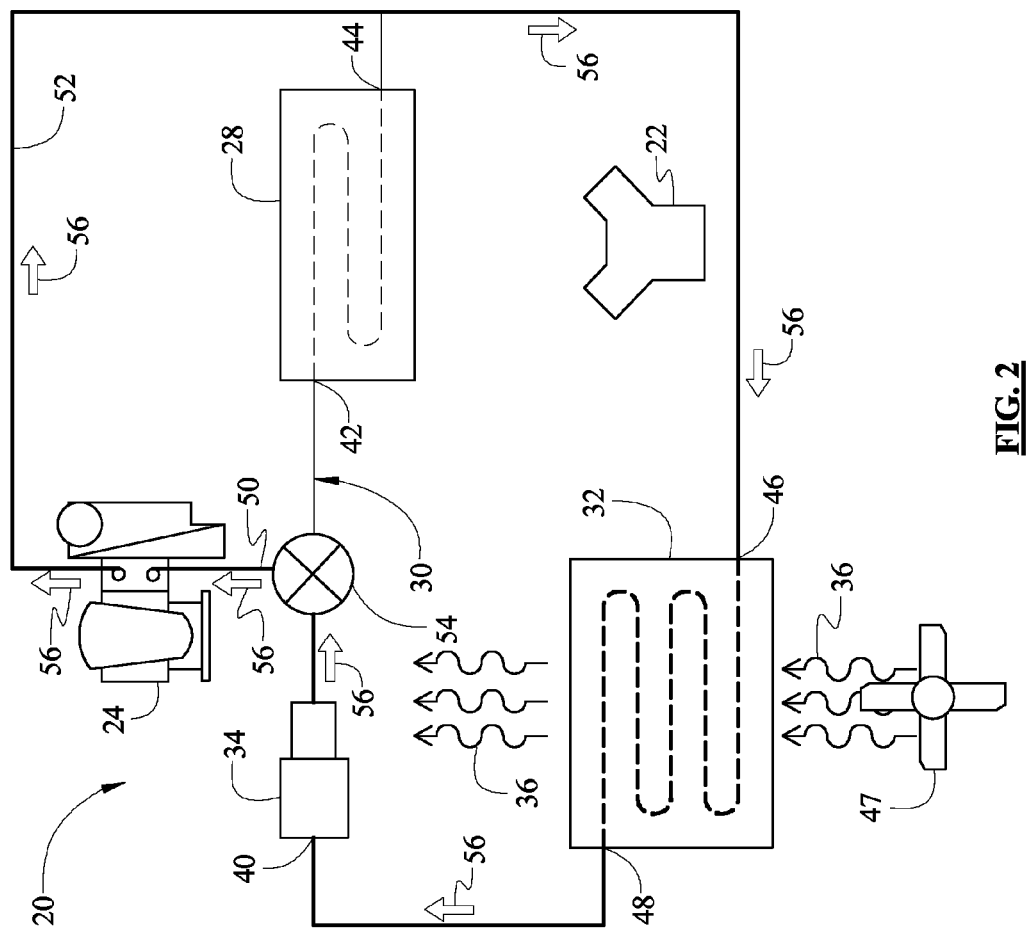
FIG. 2 is a schematic diagram of the vehicle showing the cooling fluid from the intercooler cooling fluid circuit being re-directed to cool the turbocharger.

Referring to the Figures, wherein like numerals indicate like parts throughout the several views, a vehicle is generally shown at 20 in FIGS. 1 and 2. The vehicle 20 may include any type and/or style of vehicle 20 having an internal combustion engine 22. The internal combustion engine 22 may include but is not limited to a gasoline engine or a diesel engine.

Referring to FIG. 1, the vehicle 20 further includes a turbocharger 24. The turbocharger 24 is coupled to the engine and compresses a flow of combustion air 26 prior to entering a combustion chamber of the engine (not shown). The turbocharger 24 may include any turbocharger 24 suitable for use with the internal combustion engine 22. It should also be appreciated that the turbocharger 24 may alternatively include a multi turbocharger configuration, such as but not limited to a dual turbocharger configuration or a quad turbocharger configuration, and that the turbocharger 24 should not be limited to the single turbocharger configuration shown and described herein.

The compression of the combustion air 26 increases the temperature of the combustion air 26. In order to cool the combustion air 26, the vehicle 20 further includes an intercooler 28. The intercooler 28 is a heat exchanger that transfers heat from the flow of combustion air 26 to a cooling fluid prior to the combustion air 26 entering the combustion chamber of the internal combustion engine 22. Reducing the temperature of the combustion air 26 increases the power output from the internal combustion engine 22.

The vehicle 20 further includes an intercooler cooling fluid circuit 30 that circulates a flow of cooling fluid therethrough, thereby providing the cooling fluid to the intercooler 28. The intercooler cooling fluid circuit 30 includes but is not limited to the intercooler 28, a low temperature heat exchanger 32, an intercooler pump 34, and all necessary piping and/or fittings interconnecting the various components of the intercooler cooling fluid circuit 30. The low temperature heat exchanger 32 transfers heat from the flow of cooling fluid to a flow of ambient air 36, thereby removing the heat from the cooling fluid. The intercooler pump 34 pressurizes and circulates the flow of cooling fluid through the intercooler cooling fluid circuit 30. The intercooler pump 34 may include but is not limited to an electric pump.

The cooling fluid circulates in a continuous loop through the intercooler cooling fluid circuit 30 in a direction indicated by arrow 38. Beginning at an inlet 40 of the intercooler pump 34, the intercooler pump 34 circulates the cooling fluid downstream to an inlet 42 of the intercooler 28. The cooling fluid flows through the intercooler 28, absorbing heat from the compressed combustion air 26, to an exit 44 of the intercooler 28. The cooling fluid then circulates to an intake 46 of the low temperature heat exchanger 32 downstream of the intercooler 28. The cooling fluid circulates through the low temperature heat exchanger 32, dissipating heat to the flow of ambient air 36 provided by a cooling fan 47 or the like, to an outtake 48 of the low temperature heat exchanger 32. The cooling fluid then circulates back to the inlet 40 of the intercooler pump 34, whereupon the continuous loop begins again.

The vehicle 20 further includes a first fluid passage 50 and a return fluid passage 52. The first fluid passage 50 is in fluid communication with the intercooler cooling fluid circuit 30 and the turbocharger 24, and directs the cooling fluid from the intercooler cooling fluid circuit 30 to the turbocharger 24. The return fluid passage 52 is in fluid communication with the turbocharger 24 and the intercooler cooling fluid circuit 30, and directs the flow of cooling fluid from the turbocharger 24 back to the intercooler cooling fluid circuit 30. The return fluid passage 52 connects with the intercooler cooling fluid circuit 30 upstream of the low temperature heat exchanger 32 and downstream of the intercooler 28.

A turbocharger cooling control valve 54 interconnects the first fluid passage 50 and the intercooler cooling fluid circuit 30. The turbocharger cooling control valve 54 is disposed downstream of the low temperature heat exchanger 32 and upstream of the intercooler 28. The turbocharger cooling control valve 54 is moveable between a first position and a second position. When in the first position, generally shown in FIG. 1, the turbocharger cooling control valve 54 directs the flow of cooling fluid to the intercooler 28 to absorb heat from the flow of combustion air 26. When in the second position, generally shown in FIG. 2, the turbocharger cooling control valve 54 directs the flow of cooling fluid to the turbocharger 24 to cool the turbocharger 24.

The turbocharger cooling control valve 54 is disposed in the first position when the internal combustion engine 22 is in an engine on status. The engine on status is the operating condition of the internal combustion engine 22 when the internal combustion engine 22 is running. Accordingly, when the internal combustion engine 22 is running, the internal combustion engine 22 is referred to herein as operating in the engine on status. The turbocharger cooling control valve 54 is disposed in the second position when the internal combustion engine 22 is disposed in an engine off status. The engine off status is the operating condition of the internal combustion engine 22 when the internal combustion engine 22 is not running. Accordingly, when the internal combustion engine 22 is not running, the internal combustion engine 22 is referred to herein as operating in the engine off status.

The turbocharger cooling control valve 54 is configured to switch from the first position to the second position when the internal combustion engine 22 switches from the engine on status to the engine off status. As such, when the internal combustion engine 22 is running, the turbocharger cooling control valve 54 is in the first position and directs the flow of cooling fluid to the intercooler 28 to cool the flow of combustion air 26. Referring to FIG. 2, upon the internal combustion engine 22 switching to the engine off status, i.e., when the internal combustion engine 22 stops running, the turbocharger cooling control valve 54 switches to the second position to direct the flow of cooling fluid to the turbocharger 24 to cool the turbocharger 24, thereby preventing oil coking within the turbocharger 24. As used herein, the term "oil coking" includes the breakdown of lubricating grease and/or oil within the turbocharger 24, and the formation of carbon residue on the components of the turbocharger 24. The cooling fluid circulates through a continuous loop indicated by arrows 56, shown in FIG. 2. The cooling fluid circulates through the turbocharger 24, and back through the low temperature heat exchanger 32 so that the low temperature heat exchanger 32 may dissipate the heat absorbed by the cooling fluid from the turbocharger 24. The intercooler pump 34 pressurizes and circulates the cooling fluid through the path indicated by arrows 56.

A method of cooling the turbocharger 24 is provided. The method includes spinning the turbocharger 24 to compress the flow of combustion air 26 for the internal combustion engine 22. As is known, the turbocharger 24 is spun by a flow of exhaust gas from the internal combustion engine 22. Accordingly, the turbocharger 24 is spun when the internal combustion engine 22 is operating in the engine on status, i.e., when the internal combustion engine 22 is running.

Once the internal combustion engine 22 begins to run and is operating in the engine on status, the intercooler pump 34 may be engaged to pressurize and circulate the flow of cooling fluid through the intercooler cooling fluid circuit 30. An engine control module (not shown) may engage the intercooler pump 34 by directing an electrical current to the intercooler pump 34. Once the intercooler pump 34 is engaged, the cooling fluid begins circulating through the intercooler cooling fluid circuit 30.

So long as the internal combustion engine 22 is disposed in the engine on status, the flow of cooling fluid circulating through the intercooler cooling fluid circuit 30 is directed through the intercooler 28 to remove heat from the flow of compressed combustion air 26. As such, the turbocharger cooling control valve 54 is disposed in the first position, thereby directing the cooling fluid to the intercooler 28, and blocking fluid communication to the turbocharger 24.

The method further includes sensing the operating status of the internal combustion engine 22 to determine when the internal combustion engine 22 switches from the engine on status to the engine off status. The operating status of the engine may be sensed and/or determined in any suitable manner, such as through the engine control module. Upon determination that the operating status of the internal combustion engine 22 has switched from the engine on status to the engine off status, the flow of cooling fluid circulating through an intercooler cooling fluid circuit 30 is re-directed to direct the flow of cooling fluid to the turbocharger 24 to cool the turbocharger 24. The flow of cooling fluid is then directed from the turbocharger 24 back to the intercooler cooling fluid circuit 30 by the return fluid passage 52.

As noted above, the control of the flow of cooling fluid between the turbocharger 24 and the intercooler 28 is controlled by the turbocharger cooling control valve 54. Upon the engine control module sensing the switch from the engine on status to the engine off status, the engine control module may signal the turbocharger cooling control valve 54 to switch from the first position, directing the cooling fluid to the intercooler 28, to the second position, directing the cooling fluid to the turbocharger 24. The engine control module may signal the turbocharger cooling control valve 54 to switch between the first position and the second position with an electrical signal, vacuum signal, or in some other suitable manner.

The above described method utilizes the existing intercooler pump 34 to pressurize and circulate the cooling fluid through the turbocharger 24, thereby eliminating the need for a separate and dedicated pump for circulating cooling fluid to the turbocharger 24. Accordingly, the engine control module may continue to operate the intercooler pump 34 even after the engine stops running, i.e., the operating condition of the internal combustion engine 22 has switched from the engine on status to the engine off status. The operation of the intercooler pump 34 may be continued for a specific period of time, or until an internal temperature of the turbocharger 24 drops below a pre-defined temperature.

Figure 3:
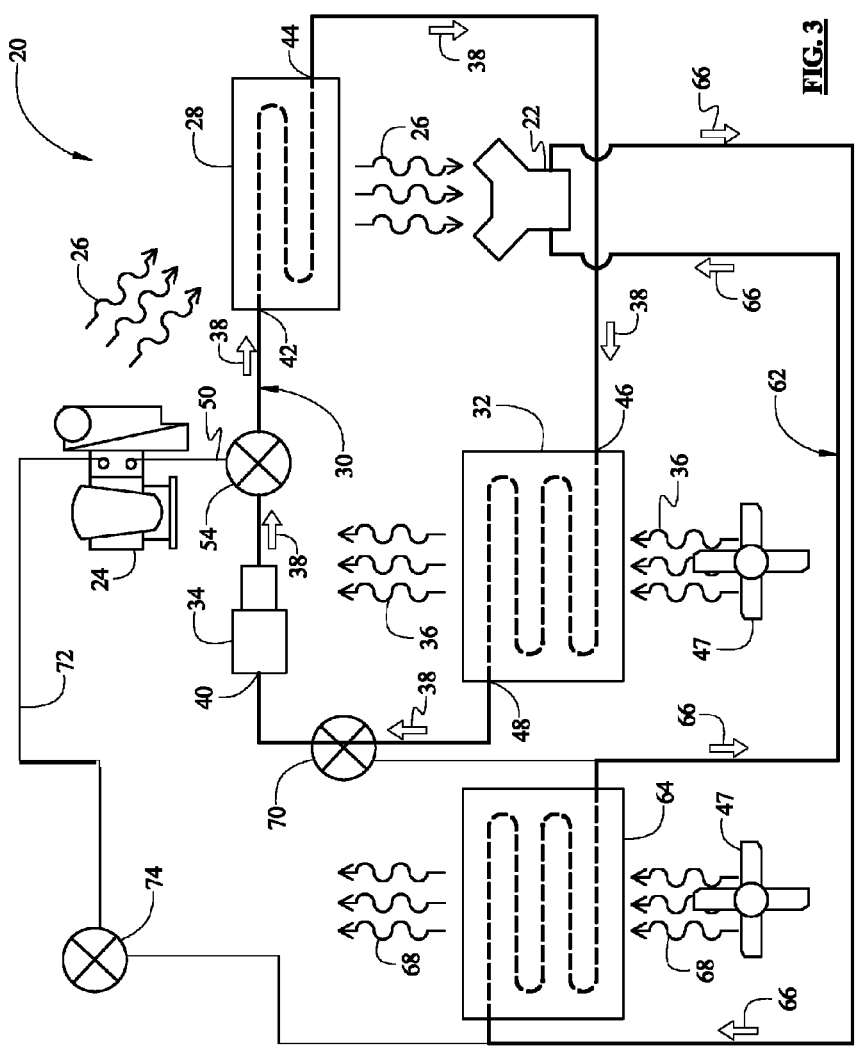
FIG. 3 is a schematic diagram of an alternative embodiment of the vehicle showing the intercooler cooling fluid circuit circulating the cooling fluid through the intercooler to cool the flow of combustion air from the turbocharger, and an engine cooling circuit circulating a cooling fluid through an internal combustion engine to cool the internal combustion engine.
Figure 4:
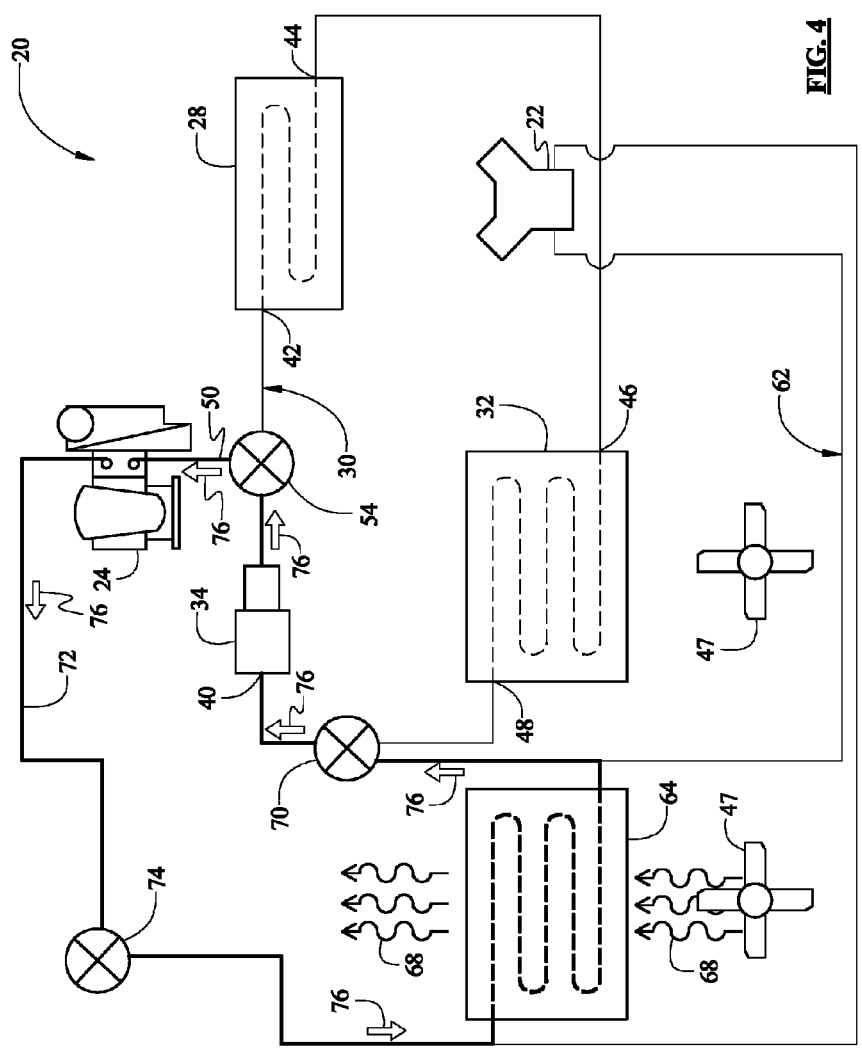
FIG. 4 is a schematic diagram of the alternative embodiment of the vehicle showing the cooling fluid being drawn from the engine cooling circuit into the turbocharger to cool the turbocharger.

Referring to FIGS. 3 and 4, an alternative embodiment of the vehicle is shown generally at 60. Throughout FIGS. 3 and 4, the turbocharger 24 and the intercooler cooling fluid circuit 30 include at least the same components and operate in the same manner as described above. Accordingly, the reference numerals used in FIG. 1 to describe, the turbocharger 24, the intercooler cooling fluid circuit 30, the intercooler 28, the low temperature heat exchanger 32, the intercooler pump 34, the turbocharger cooling control valve 54, the first fluid passage 50 and other identical shared components are also used in FIGS. 3 and 4.

Referring to FIG. 3, the vehicle 60 includes an engine cooling circuit 62. The engine cooling circuit 62 includes a primary heat exchanger 64, e.g., a radiator, and a cooling fluid circulating in a continuous loop through the internal combustion engine 22 and the primary heat exchanger 64. The cooling fluid circulates through the engine cooling circuit 62 in a direction indicated by arrows 66. The cooling fluid absorbs heat from the internal combustion engine 22 as the cooling fluid circulates through the internal combustion engine 22. The cooling fluid then circulates through the primary heat exchanger 64, where the heat within the cooling fluid is dissipated into a flow of ambient air 68, provided by a cooling fan 47 or other similar device.

The engine cooling circuit 62 is in fluid communication with the intercooler cooling fluid circuit 30. A cooling circuit control valve 70 is in fluid communication with and interconnects the engine cooling circuit 62 and the intercooler cooling fluid circuit 30. The cooling circuit control valve 70 is connected to the engine cooling circuit 62 downstream of the primary heat exchanger 64, and upstream of the turbocharger cooling control valve 54. The cooling circuit control valve 70 is also disposed downstream of the low temperature heat exchanger 32.

The cooling circuit control valve 70 is moveable between a first position and a second position. When in the first position, generally shown in FIG. 3, the cooling circuit control valve 70 opens fluid communication between the low temperature heat exchanger 32 and the turbocharger cooling control valve 54, and closes fluid communication between the engine cooling circuit 62 and the turbocharger cooling control valve 54. When in the second position, generally shown in FIG. 4, the cooling circuit control valve 70 closes fluid communication between the low temperature heat exchanger 32 and the turbocharger cooling control valve 54, and opens fluid communication between the engine cooling circuit 62 and the turbocharger cooling control valve 54. The cooling circuit control valve 70 is disposed in the first position when the internal combustion engine 22 is in the engine on status, and is disposed in the second position when the internal combustion engine 22 is in the engine off status. The cooling circuit control valve 70 switches from the first position to the second position when the internal combustion engine 22 switches from the engine on status to the engine off status.

As shown in FIG. 3, when the internal combustion engine 22 is operating in the engine on status, i.e., is running, the cooling circuit control valve 70 is in the first position to block fluid flow between the engine cooling circuit 62 and the intercooler cooling fluid circuit 30, and the turbocharger cooling control valve 54 is in the first position to direct the cooling fluid to the intercooler 28 as described above. As shown in FIG. 4, upon the internal combustion engine 22 switching from the engine on status to the engine off status, i.e., when the internal combustion engine 22 stops running, the cooling circuit control valve 70 switches to the second position so that cooling fluid may circulate between the engine cooling circuit 62 and the intercooler cooling fluid circuit 30. Simultaneously, the turbocharger cooling control valve 54 switches to the second position to direct the cooling fluid to the turbocharger 24 to cool the turbocharger 24 as described above. Accordingly the cooling fluid to cool the turbocharger 24 comes from the engine cooling circuit 62.

Referring to FIGS. 3 and 4, the vehicle 60 includes a return fluid passage 72. The return fluid passage 72 is in fluid communication with the turbocharger 24 and the engine cooling circuit 62. The return fluid passage 72 directs the flow of cooling fluid from the turbocharger 24 back to the engine cooling circuit 62. The return fluid passage 72 connects to the engine cooling circuit 62 upstream of the primary heat exchanger 64.

A fluid return control valve 74 is disposed within the return fluid passage 72. The fluid return control valve 74 controls fluid flow through the return fluid passage 72. The fluid return control valve 74 is movable between an open position and a closed position. When in the open position, generally shown in FIG. 4, the fluid return control valve 74 allows the flow of the cooling fluid to circulate through the turbocharger 24 and back to the engine cooling circuit 62, as indicated by arrows 76 shown in FIG. 4. When in the closed position, generally shown in FIG. 3, the fluid return control valve 74 blocks circulation of the cooling fluid through the return fluid passage 72, thereby preventing a backflow from the engine cooling circuit 62 back into the turbocharger 24. The fluid return control valve 74 is disposed in the open position when the internal combustion engine 22 is in the engine off status, and is disposed in the closed position when the internal combustion engine 22 is disposed in an engine on status. The fluid return control valve 74 switches from the closed position to the open position when the internal combustion engine 22 switches from the engine on status to the engine off status, i.e., when the internal combustion engine 22 stops running.

Referring to FIG. 4, when the internal combustion engine 22 is in the engine off status, the cooling fluid circulates through a continuous loop indicated by the arrows 76. The cooling fluid circulates from the primary heat exchanger 64 through the cooling circuit control valve 70, the intercooler pump 34 and the turbocharger cooling control valve 54 to the turbocharger 24. The cooling fluid exits the turbocharger 24 and flows back to the primary heat exchanger 64 through the fluid return control valve 74. The primary heat exchanger 64 dissipates the heat absorbed by the cooling fluid from the turbocharger 24. The intercooler pump 34 pressurizes and circulates the cooling fluid through the continuous loop indicated by arrows 76.

A method of cooling the turbocharger 24 includes spinning the turbocharger 24 to compress the flow of combustion air 26 for the internal combustion engine 22. As is known, the turbocharger 24 is spun by a flow of exhaust gas from the internal combustion engine 22. Accordingly, the turbocharger 24 is spun when the internal combustion engine 22 is operating in the engine on status, i.e., when the internal combustion engine 22 is running.

Once the internal combustion engine 22 begins to run and is operating in the engine on status, the intercooler pump 34 may be engaged to pressurize and circulate the flow of cooling fluid through the intercooler cooling fluid circuit 30. An engine control module may engage the intercooler pump 34 by directing an electrical current to the intercooler pump 34. Once the intercooler pump 34 is engaged, the cooling fluid begins circulating through the intercooler cooling fluid circuit 30.

So long as the internal combustion engine 22 is disposed in the engine on status, the flow of cooling fluid circulating through the intercooler cooling fluid circuit 30 is directed through the intercooler 28 to remove heat from the flow of compressed combustion air 26. As such, the turbocharger cooling control valve 54 is disposed in the first position, thereby directing the cooling fluid to the intercooler 28, and blocking fluid communication to the turbocharger 24.

The method further includes sensing the operating status of the internal combustion engine 22 to determine when the internal combustion engine 22 switches from the engine on status to the engine off status. The operating status of the engine may be sensed and/or determined in any suitable manner, such as with the engine control module. Upon determination that the operating status of the internal combustion engine 22 has switched from the engine on status to the engine off status, the intercooler cooling fluid circuit 30 is connected with the engine cooling circuit 62 to draw cooling fluid from the engine cooling circuit 62. Simultaneously, the flow of cooling fluid circulating through the intercooler cooling fluid circuit 30 is re-directed to direct the flow of cooling fluid to the turbocharger 24 to cool the turbocharger 24. Accordingly, the cooling fluid is drawn from the engine cooling circuit 62 and circulated to the turbocharger 24 via the portion of the intercooler cooling fluid circuit 30 disposed between the cooling circuit control valve 70 and the turbocharger cooling control valve 54. Additionally, once the determination that the operating status of the internal combustion engine 22 has switched from the engine on status to the engine off status, the fluid return control valve 74 switches from the closed position to the open position to allow fluid communication through the return fluid passage 72. The flow of cooling fluid is then directed from the turbocharger 24 back to the engine cooling circuit 62 through the return fluid passage 72.

As noted above, the connection between the engine cooling circuit 62 and the intercooler cooling fluid circuit 30 is controlled by the cooling circuit control valve 70. Upon the engine control module sensing the switch from the engine on status to the engine off status, the engine control module may signal the cooling circuit control valve 70 to switch from the first position, preventing fluid communication between the engine cooling circuit 62 and the intercooler cooling fluid circuit 30, to the second position, allowing fluid communication between the engine cooling circuit 62 and the intercooler cooling fluid circuit 30. The engine control module may signal the cooling circuit control valve 70 to switch between the first position and the second position with an electrical signal, vacuum signal, or in some other suitable manner.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a turbocharger for compressing a flow of combustion air;
an intercooler cooling fluid circuit circulating a flow of cooling fluid therethrough, the intercooler cooling fluid circuit including:
a low temperature heat exchanger configured for transferring heat from the flow of cooling fluid to a flow of ambient air;
an intercooler pump configured for circulating the flow of cooling fluid through the intercooler cooling fluid circuit; and
an intercooler configured for transferring heat from the flow of compressed combustion air to the flow of cooling fluid;
a first fluid passage in fluid communication with the intercooler cooling fluid circuit and the turbocharger; and
a turbocharger cooling control valve interconnecting the first fluid passage and the intercooler cooling fluid circuit, the turbocharger cooling control valve disposed downstream of the low temperature heat exchanger and upstream of the intercooler, and moveable between a first position directing the flow of cooling fluid to the intercooler to absorb heat from the flow of combustion air, and a second position directing the flow of cooling fluid to the turbocharger to cool the turbocharger.

2. A vehicle as set forth in claim 1 further comprising a return fluid passage in fluid communication with the turbocharger and the intercooler cooling fluid circuit for directing the flow of cooling fluid from the turbocharger back to the intercooler cooling fluid circuit.

3. A vehicle as set forth in claim 1 wherein the intercooler pump includes an electric pump.

4. A vehicle as set forth in claim 1 wherein the turbocharger cooling control valve is disposed in the first position when an internal combustion engine is in an engine on status, and wherein the turbocharger cooling control valve is disposed in the second position when the internal combustion engine is in an engine off status.

5. A vehicle as set forth in claim 4 wherein the turbocharger cooling control valve is configured to switch from the first position to the second position when the internal combustion engine switches from the engine on status to the engine off status.

6. A vehicle as set forth in claim 5 further comprising a cooling circuit control valve disposed downstream of the low temperature heat exchanger and upstream of the turbocharger cooling control valve, the cooling circuit control valve interconnecting the intercooler cooling fluid circuit with the engine cooling circuit, and moveable between a first position and a second position, with the cooling circuit control valve opening fluid communication between the low temperature heat exchanger and the turbocharger cooling control valve, and closing fluid communication between the engine cooling circuit and the turbocharger cooling control valve when in the first position, with the cooling circuit control valve closing fluid communication between the low temperature heat exchanger and the turbocharger cooling control valve, and opening fluid communication between the engine cooling circuit and the turbocharger cooling control valve when in the second position.

7. A vehicle as set forth in claim 6 further comprising a return fluid passage in fluid communication with the turbocharger and the engine cooling circuit for directing the flow of cooling fluid from the turbocharger back to the engine cooling circuit.

8. A vehicle as set forth in claim 7 wherein the cooling circuit control valve is disposed in the first position when the internal combustion engine is in the engine on status, and wherein the cooling circuit control valve is disposed in the second position when the internal combustion engine is in the engine off status.

9. A vehicle as set forth in claim 8 wherein the cooling circuit control valve is configured to switch from the first position to the second position when the internal combustion engine switches from the engine on status to the engine off status.

10. A vehicle as set forth in claim 7 further comprising a fluid return control valve disposed within the return fluid passage and movable between an open position allowing the flow of the cooling fluid to circulate through the turbocharger and back to the engine cooling circuit, and a closed position blocking circulation through the return fluid passage.

11. A vehicle as set forth in claim 10 wherein the fluid return control valve is disposed in the open position when the internal combustion engine is in the engine off status, and wherein the fluid return control valve is disposed in the closed position when the internal combustion engine is in an engine on status.

12. A vehicle as set forth in claim 11 wherein the fluid return control valve is configured to switch from the closed position to the open position when the internal combustion engine switches from the engine on status to the engine off status.

13. A vehicle as set forth in claim 10 wherein the engine cooling circuit includes a primary heat exchanger, with the cooling circuit control valve in fluid communication with the engine cooling circuit downstream of the primary heat exchanger, and the fluid return passage in fluid communication with the engine cooling circuit upstream of the primary heat exchanger.

14. A method of cooling a turbocharger for an internal combustion engine system having an intercooler, a low temperature heat exchanger configured for transferring heat from a flow of cooling fluid to a flow of ambient air; a turbocharger cooling control valve being disposed within a first fluid passage and positioned downstream of the low temperature heat exchanger and upstream of the intercooler, the method comprising:
    determining an operating status of the internal combustion engine;
    wherein the operating status of the internal combustion engine is on,
        directing the flow of the cooling fluid circulating through the intercooler cooling fluid circuit through the intercooler to remove heat from the flow of compressed combustion air when the internal combustion engine is operating in the engine on status; and
    wherein the operating status of the internal combustion engine is switched from the engine on status to the engine off status,
        controlling the turbocharger cooling control valve; and
        re-directing the flow of the cooling fluid circulating through the intercooler cooling fluid circuit to the turbocharger to cool the turbocharger.

15. A method as set forth in claim 14 further comprising spinning the turbocharger to compress a flow of combustion air for the internal combustion engine when the internal combustion engine is operating in an engine on status.

16. A method as set forth in claim 15 further comprising engaging an intercooler pump to pressurize and circulate the flow of cooling fluid through the intercooler cooling fluid circuit.

17. A method as set forth in claim 16 further comprising directing the flow of cooling fluid from the turbocharger back to the intercooler cooling fluid circuit.

18. A method as set forth in claim 16 further comprising connecting the intercooler cooling fluid circuit with an engine cooling circuit to draw cooling fluid from the engine cooling circuit when the flow of cooling fluid is re-directed to the turbocharger.

19. A method as set forth in claim 17 further comprising directing the flow of cooling fluid from the turbocharger back to the engine cooling circuit.

* * * * *